United States Patent
Kaiser et al.

(10) Patent No.: US 10,141,810 B2
(45) Date of Patent: Nov. 27, 2018

(54) CONNECTION SUPPORT ASSEMBLY FOR STATOR ASSEMBLY

(71) Applicant: GM GLOBAL TECHNOLOGY OPERATIONS LLC, Detroit, MI (US)

(72) Inventors: Edward L. Kaiser, Orion, MI (US);
Paul Buchholz, Warren, MI (US);
Xiaohui Du, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 15/056,481

(22) Filed: Feb. 29, 2016

(65) Prior Publication Data

US 2017/0250588 A1 Aug. 31, 2017

(51) Int. Cl.
| H02K 1/16 | (2006.01) |
| H02K 3/12 | (2006.01) |
| H02K 3/50 | (2006.01) |
| H02K 5/22 | (2006.01) |

(52) U.S. Cl.
CPC .............. *H02K 5/225* (2013.01); *H02K 1/16* (2013.01); *H02K 3/12* (2013.01); *H02K 3/50* (2013.01); *H02K 2203/06* (2013.01); *H02K 2203/09* (2013.01)

(58) Field of Classification Search
CPC ............ H02K 1/16; H02K 1/165; H02K 3/12; H02K 3/14; H02K 3/28; H02K 5/225; H02K 15/0043
USPC .......................................................... 310/71
See application file for complete search history.

(56) References Cited

U.S. PATENT DOCUMENTS

| 2012/0104885 | A1* | 5/2012 | Cominetti | ................. H02K 3/12 |
| | | | | 310/71 |
| 2015/0042190 | A1* | 2/2015 | Nagumo | ................. H02K 3/522 |
| | | | | 310/71 |
| 2015/0357883 | A1* | 12/2015 | Fairall | ..................... H02K 9/193 |
| | | | | 310/46 |
| 2015/0381002 | A1* | 12/2015 | Hashimoto | ............. H02K 3/522 |
| | | | | 310/71 |
| 2016/0181881 | A1* | 6/2016 | Magri | ...................... H02K 3/12 |
| | | | | 310/71 |

FOREIGN PATENT DOCUMENTS

| CN | 102969809 | A | 3/2013 | |
| CN | 104471839 | A | 3/2015 | |
| DE | 102014214909 | A1 * | 2/2016 | ............... H02K 3/50 |
| JP | WO 2014129288 | A1 * | 8/2014 | ............. H02K 3/522 |

OTHER PUBLICATIONS

Braun, Machine Translation of DE102014214909, Feb. 2016.*

* cited by examiner

*Primary Examiner* — Thomas Truong
*Assistant Examiner* — Eric Johnson
(74) *Attorney, Agent, or Firm* — Quinn IP Law

(57) ABSTRACT

A connection support assembly for a stator assembly can be used to secure electrical jumper wires of an electric machine. The connection support assembly includes a support body and a catch protruding from the support body. The catch defines an opening. The connection support assembly further includes a clip coupled to the support body. The clip includes a clip body and a pin protruding from the clip body. The pin extends through the opening of the catch in order to couple the clip to the support body and clamp at least some electrical jumper wires between the support body and the clip.

8 Claims, 3 Drawing Sheets

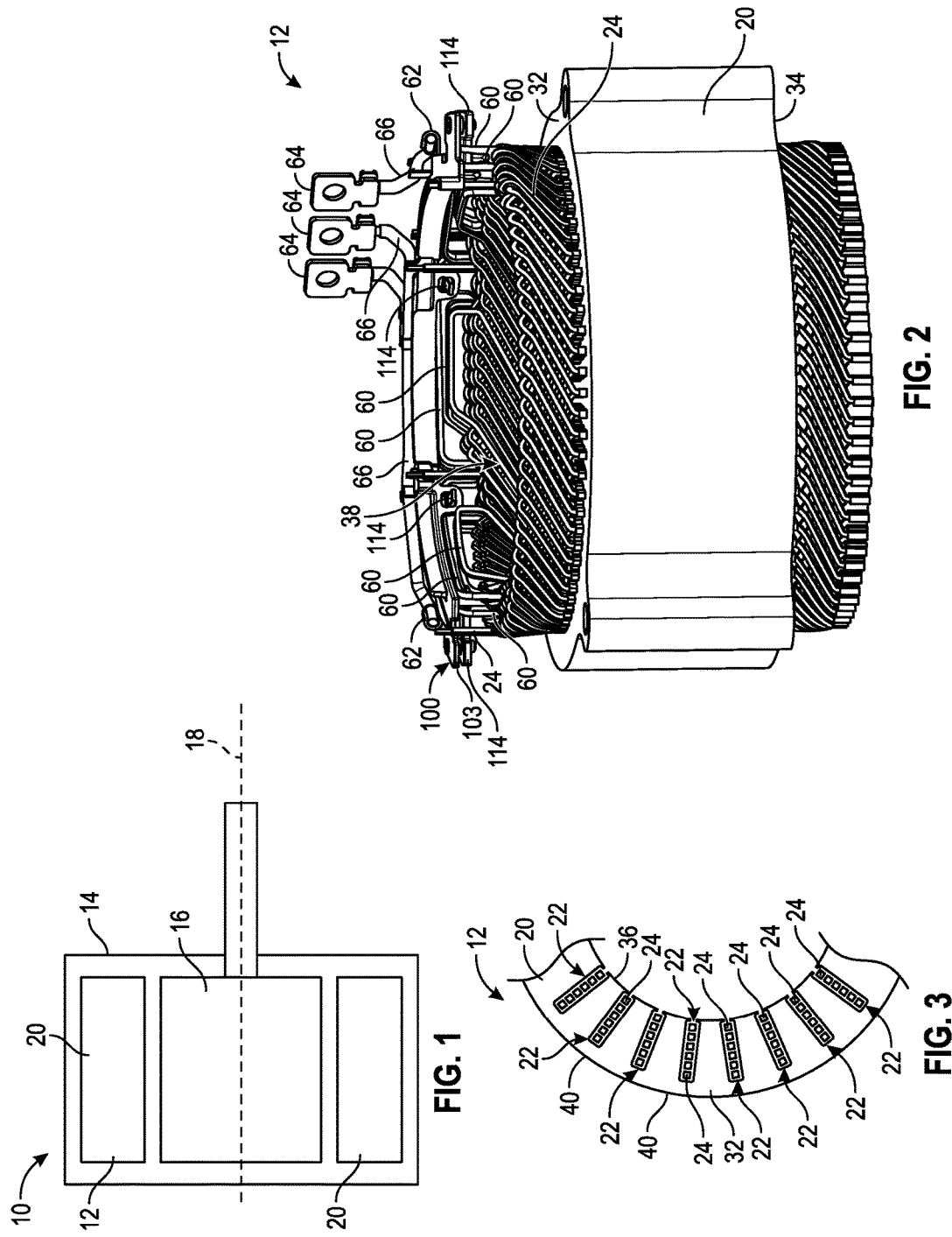

CONNECTION SUPPORT ASSEMBLY FOR STATOR ASSEMBLY

TECHNICAL FIELD

The present disclosure relates to a connection support assembly for securing electrical jumper wires of a stator assembly of an electric machine.

BACKGROUND

The electric machine can convert electrical energy into mechanical energy, or vice-versa. For instance, an electric machine can covert an alternating current into mechanical energy.

SUMMARY

The present disclosure describes a connection support assembly for a stator assembly of an electric machine. The connection support assembly can be used to secure electrical jumper wires of an electric machine. By securing at least some electrical jumper wires, the connection support assembly minimizes the stress in the weld joints of the electric machine. In one embodiment, the connection support assembly includes a support body and a catch protruding from the support body. The catch defines an opening. The connection support assembly further includes a clip coupled to the support body. The clip includes a clip body and a pin protruding from the clip body. The pin extends through the opening of the catch in order to couple the clip to the support body and clamp at least some electrical jumper wires between the support body and the clip. The present disclosure also relates to a stator assembly including the connection support assembly. The stator assembly includes a stator core defining slots spaced apart from each other, bar conductors disposed in each of the slots, and electrical jumper wires electrically connected to at least some of the bar conductors. The connection support assembly can secure at least one of the electrical jumper wires in order to minimize stress in the weld joints of the electric machine.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic plan view of an electric machine including a stator assembly and a rotor.

FIG. 2 is a schematic perspective view of the stator assembly of the electric machine schematically illustrated in FIG. 1.

FIG. 3 is a schematic fragmentary end view of a stator core of the stator assembly shown in FIG. 2.

DETAILED DESCRIPTION

Figure 4:
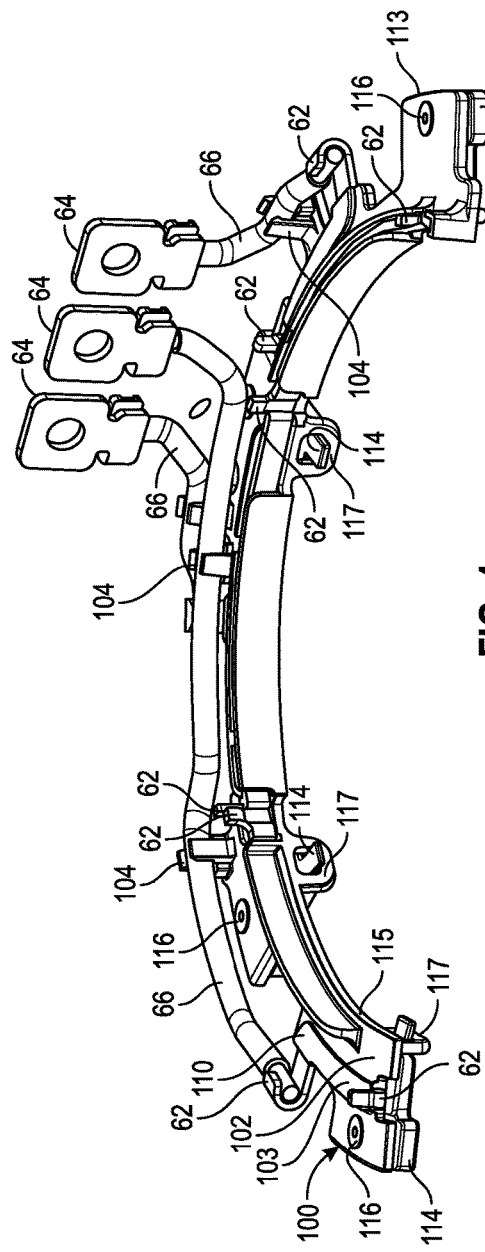
FIG. 4 is a schematic perspective view of a connection support assembly, terminals, and electrical leads electrically connected to the terminals and attached to the connection support assembly.

Referring to the drawings, wherein like reference numbers correspond to like or similar components throughout the several figures, and beginning with FIGS. 1 and 2, an electric machine 10 includes a stator assembly 12 and a rotor 16 operatively coupled to the stator assembly 12. The electric machine 10 can be utilized in a vehicle. The vehicle can be a passenger vehicle, a commercial vehicle, or any other suitable vehicle capable of carrying people or objects. For example, the vehicle can be a battery electric vehicle, a hybrid electric vehicle including a plug-in hybrid electric vehicle, an extended range electric vehicle or any other suitable vehicles. The electric machine 10 can include, but is not limited to, an electric motor, a traction motor or other similar device. For example, the electric machine 10 can be a permanent magnet motor, an induction motor, synchronous motor, etc. The electric machine 10 can include any device configured to generate an electric machine torque by, for example, converting electrical energy into rotational motion. The electric machine 10 can be configured to receive electrical energy from a power source, such as a battery array. The power source can be configured to store and output electrical energy.

The vehicle can include an inverter for converting the direct current (DC) voltage from the battery array into alternating current (AC) voltage. The electric machine 10 can be configured to use the AC voltage from the inverter to generate rotational motion. The electric machine 10 can also be configured to generate electrical energy when provided with mechanical energy, such as the mechanical energy (torque) of an engine.

Referring to FIG. 1, the electric machine 10 can include a housing 14. The housing 14 can be manufactured from any suitable material, including but not limited to aluminum, and can include any suitable size, shape and/or configuration suitable to house the internal components of the electric machine 10. For example, the stator assembly 12 is supported by the housing 14. Specifically, the stator assembly 12 is fixed relative to the housing 14. In other words, the stator assembly 12 is stationary relative to the housing 14.

The electric machine 10 also includes a rotor 16 rotatably supported by the housing 14. The rotor 16 can rotate relative to the stator assembly 12 about a longitudinal axis 18. The rotor 16 can include, for example, windings or permanent magnets that interact with the poles of the stator assembly 12 to generate rotation of the rotor 16 relative to the stator assembly 12. The rotor 16 can be an interior permanent magnet, a surface permanent magnet, an induction, synchronous, reluctance or a separately-excited/wound-field rotor. The rotor 16 is shown schematically in FIG. 1 for illustrative purposes only.

Referring to FIGS. 1, 2 and 3, the stator assembly 12 further includes a stator core 20 defining a plurality of slots 22 (see FIG. 3) spaced from each other. The stator assembly 12 also includes a plurality of bar conductors 24 (FIG. 2) disposed in each of the slots 22 and arranged in one or more winding paths. The electric machine 10 can operate in response to voltage applied to the winding paths from the inverter, which creates torque-producing current in the winding paths which causes the rotor 16 to rotate. The bar conductors 24 are sometimes referred to as hairpin conductors, and can be a substantially rectangular cross-section.

The stator core 20 extends between a first core end 32 and a second core end 34 along the longitudinal axis 18. The slots 22 are spaced from each other radially about the longitudinal axis 18 and each extends between the first and second core ends 32, 34 of the stator core 20. Therefore, the slots 22 can extend lengthwise along the longitudinal axis 18. In certain embodiments, there are exactly seventy-two slots 22 defined in the stator core 20, and the stator core 20 defines eight poles.

The stator core 20 can include an inner stator wall 36 defining a stator hole 38 along the longitudinal axis 18 such that the inner stator wall 36 is spaced radially away from the longitudinal axis 18. The rotor 16 is disposed in the stator hole 38 of the stator core 20 and is rotatable relative to the inner stator wall 36 of the stator core 20 when current is traveling through the stator core 20. Furthermore, the slots 22 can intersect the inner stator wall 36. The stator core 20 can also include an outer stator wall 40 opposing the inner stator wall 36. Therefore, the inner stator wall 36 and the outer wall 40 are spaced from each other transverse to the longitudinal axis 18. As such, the inner stator wall 36 defines an inner diameter, and the outer stator wall 40 defines an outer diameter greater than the inner diameter. The stator assembly 12 also includes a plurality of electrical jumper wires 60 electrically connected to a predetermined number of the bar conductors 24 in order to control the amount of current flowing through winding paths.

The stator assembly 12 can further include a plurality of stator connectors 62, with one or more of the terminals 64 being electrically connected to the stator connectors 62 to direct or transfer current into the stator core 20. The terminals 64 are configured to be electrically connected to the power source (e.g., a battery pack). Electrical leads 66 electrically connect the terminals 64 to the stator connectors 62. The stator connectors 62 are electrically connected to at least some of the bar conductors 24. For example, a weld joint J (FIG. 6) can be used to electrically connect one of the stator connectors 62 to one of the bar conductors 24.

With reference to FIGS. 2 and 4-6, the stator assembly 12 also includes a connection support assembly 100 that can support various electrical jumper wires 60 and electrical leads 66. The connection support assembly 100 includes a support body 102, which may be configured as a semicircular plate or connection ring 103. Regardless of its specific configuration, the support body 102 is wholly or partly made of a substantially rigid polymeric material and has a first or top surface 110 and a second or bottom surface 112 opposite the first surface 110. The first surface 110 of the support body 102 faces away from the stator core 20, and the second surface 112 of the support body 102 faces toward the stator core 20. The support body 102 also defines an outermost surface 113 and an innermost surface 115 opposite the outermost surface 113. The connection support assembly 100 includes a catch 117 protruding from the support body 102. As non-limiting examples, the catch 117 may be configured as a loop, a clasp, or a hook. The catch 117 protrudes from the second surface 112 (in a direction away from the first surface 110) and is coupled to the support body 102 at a location closer to the innermost surface 115 than to the outermost surface 113. In the depicted embodiment, the catch 117 is configured as a loop 119. The loop 119 has an outer surface 121 and an inner surface 123 opposite the outer surface 121. Further, the loop 119 has an opening 125, such as a slot, defined by the inner surface 123. As discussed in detail below, the catch 117 may include a ramp 127 (FIG. 8) defined along the inner surface 123 in order to facilitate assembly of the connection support assembly 100. In the depicted embodiment, the connection support assembly 100 includes four catches 117.

The connection support assembly 100 includes lead couplers 104 for attaching the electrical leads 66 to the support body 102. The lead couplers 104 protrude from the support body 102 in a direction away from the stator core 20. Each lead coupler 104 includes a coupler body 106 and a pair of substantially parallel columns 108 protruding from the coupler body 106. At least one electrical lead 66 is disposed on the coupler body 106 and between the pair of substantially parallel columns 108.

Figure 5:
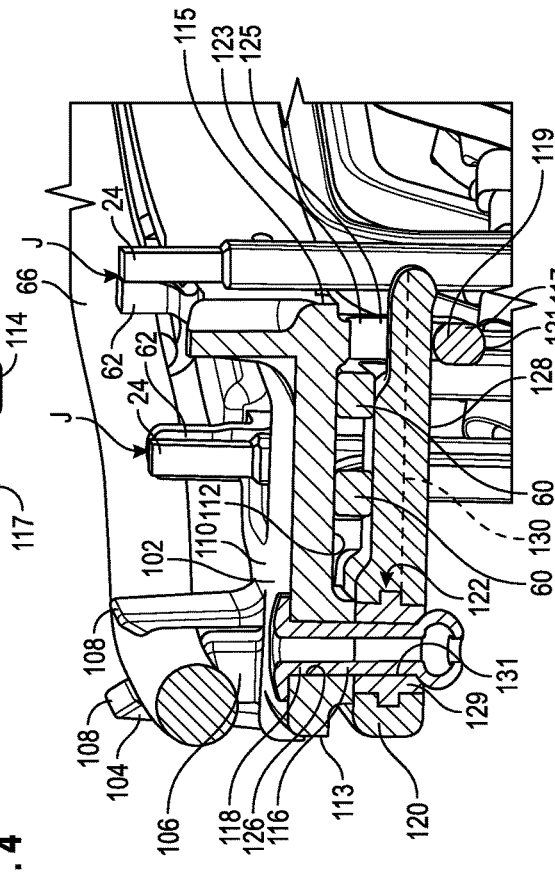
FIG. 5 is a schematic, perspective, cross-sectional view of the connection support assembly and electrical jumper wires, wherein the connection support assembly includes a support body and a clip coupled to the support body, and the electrical jumper wires are clamped between the clip and the support body.
Figure 6:
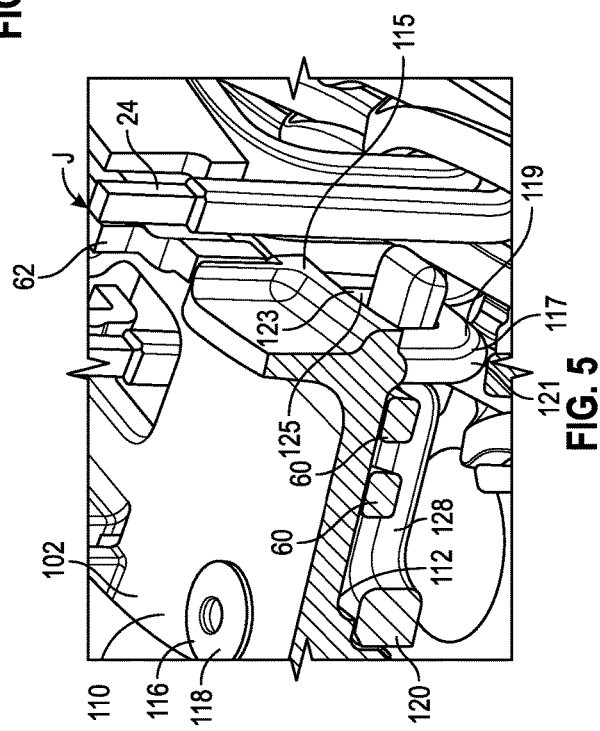
FIG. 6 is another schematic, perspective, cross-sectional view of the connection support assembly and the electrical jumper wires.

With reference to FIGS. 4-6, in addition to the lead couplers 104, the connection support assembly 100 includes a clip 114 coupled to (and below) the support body 102. The clip 114 can assist in securing at least some electrical jumper wires 60 (e.g., magnet wires) to the support body 102 in order to reduce stress in the weld joints J during operation of the electric machine 10. In the depicted embodiment, the connection support assembly 100 includes four clips 114 engaged with catches 117; however, the connection support assembly 100 may include more or fewer clips 114. Overmolding can be used to make the clips 114.

A fastener 116 directly interconnects the clip 114 to the support body 102. As a non-limiting example, a rivet 118 directly couples support body 102 to the clip 114. The clip 114 is wholly or partly made of a substantially rigid polymeric material and includes a clip body 120 directly coupled to the support body 102 through the fastener 116. The clip body 120 defines a clip hole 122 configured, shaped, and sized to receive the fastener 116. Accordingly, the fastener 116 is directly coupled to the clip body 120. An insert 129 is disposed inside the clip hole 122 and surrounds the fastener 116 in order relief stress in the fastener 116. Accordingly, the insert 129 can be configured as a collar and may be wholly or partly made of a metallic material. In the depicted embodiment, the insert 129 has an insert hole 131 configured, shaped, and sized to at least partially receive the fastener 116. The support body 102 defines a body hole 126 aligned with the clip hole 124. As such, the fastener 116 can extend through the body hole 126 and the clip hole 124.

The clip 114 further includes a pin 128 protruding from the clip body 120. The pin 128 extends through the opening 125 of the catch 117. Therefore, at least some of the electrical jumper wires 60 are clamped between the support body 102 and the pin 128. Specifically, some of the electrical jumper wires 60 are clamped between the pin 128 and the second surface 112 of the support body 102. A spring steel piece 130 may be partly or entirely disposed inside the pin 128 in order to enhance the structural integrity of the pin 128. For instance, the pin 128 may be molded over the spring steel piece 130.

Figure 7:
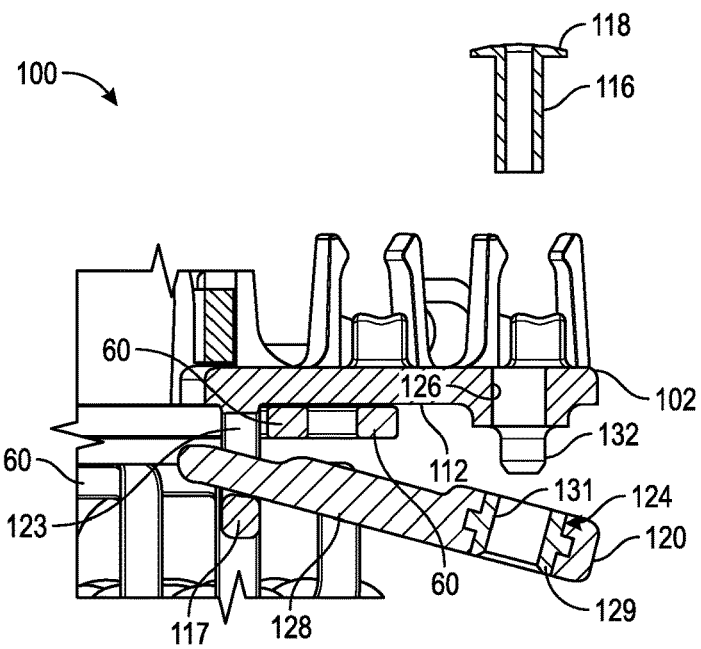
FIG. 7 is a schematic, fragmentary, perspective, cross-sectional view, illustrating the clip being coupled to the support body of the connection support assembly.
Figure 8:
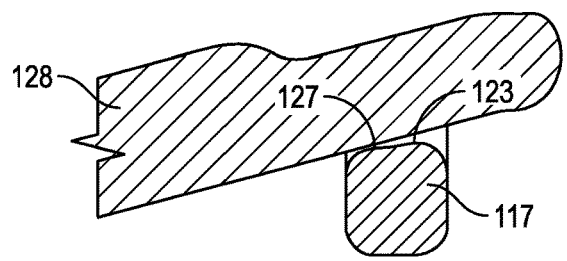
FIG. 8 is a schematic, fragmentary, cross-sectional view, illustrating the clip being inserted into a catch of the connection support assembly.
Figure 9:
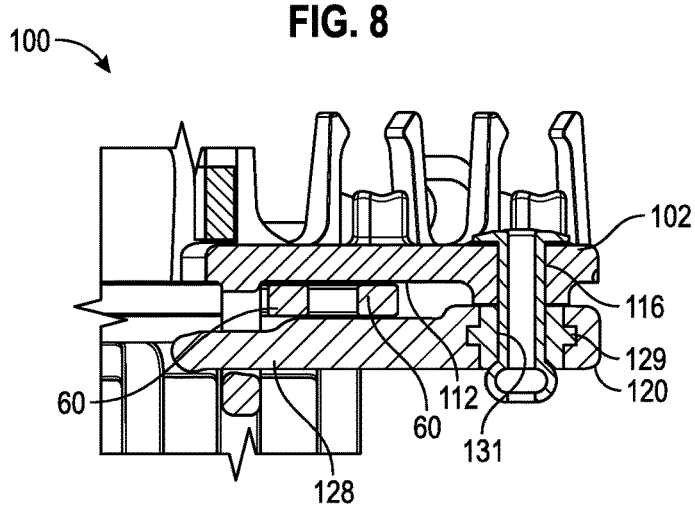
FIG. 9 is a schematic, fragmentary, perspective, cross-sectional view, illustrating the clip coupled to the support body in the final assembled condition.

With reference to FIGS. 7-9, to assemble the connection support assembly 100, the pin 128 can be inserted through the opening 125 of the catch 117 (as shown in FIG. 7) at an oblique angle relative to the catch 117. The ramp 127 on the inner surface 123 of the catch 117 facilitates insertion of the pin 128 through the opening 125 of the catch 117 as shown in FIG. 8. Once the pin 128 is disposed through the opening 125 of the catch 117, the clip body 120 is moved toward the support body 102, causing the pin 128 to clamp some of the electrical jump wires 60 against the second surface 112 of the support body 102. The clip body 120 is also moved toward the support body in order to align the body hole 126 with the clip hole 124. The support body 102 may include a locating protrusion 132 to help align the body hole 126 with the clip hole 124. The locating protrusion 132 may be hollow to allow the fastener 116 to be inserted therethrough. Then, the fastener 116 is inserted through the body hole 126 and the clip hole 124 in order to couple the clip 114 to the support body 102. For example, the rivet 118 can be riveted through the support body 102 and the clip 114.

While the best modes for carrying out the teachings have been described in detail, those familiar with the art to which this disclosure relates will recognize various alternative designs and embodiments for practicing the teachings within the scope of the appended claims.

The invention claimed is:

1. A stator assembly, comprising:
a stator core defining a plurality of slots spaced apart from each other;
a plurality of bar conductors disposed in each of the slots;
a plurality of electrical jumper wires electrically connected to at least some of the bar conductors;
a connection support assembly including:
a support body defining a body hole;
a clip coupled to the support body, wherein the clip includes a clip body and a pin protruding from the clip body, the clip defines a clip hole extending through the clip body, the clip hole is aligned with the body hole, and at least one of the electrical jumper wires is clamped between the clip and the support body;
a catch protruding from the support body and coupled to the clip, wherein the catch defines an opening, and the body hole is radially outward of the opening of the catch; and
wherein the support body is a semi-circular plate, the support body is wholly made of a polymeric material, the support body has a top surface and a bottom surface opposite the top surface, the top surface of the support body faces away from the stator core, the bottom surface of the support body faces toward the stator core, the catch protrudes directly from the bottom surface in a direction away from the top surface, the support body includes an outermost surface and an innermost surface opposite the outermost surface, the outermost surface and the innermost surface face opposite directions, the catch protrudes from the support body at a location closer to the innermost surface than to the outermost surface, the catch is a loop, the loop has an outer surface and an inner surface opposite the outer surface, the inner surface of the loop defines the opening, the catch includes a ramp defined along the inner surface of the loop, the clip is wholly made of a polymeric material, the connection support assembly further includes a spring steel piece entirely disposed inside the pin, the connection support assembly further includes an insert disposed in the clip hole, the insert is a collar, the insert is wholly made of a metallic material, the insert has an insert hole, and an entirety of the pin is closer to the bottom surface than to the top surface of the support body.

2. The stator assembly of claim 1, further comprising a fastener interconnecting the clip to the support body.

3. The stator assembly of claim 2, wherein the pin extends through the opening of the catch.

4. The stator assembly of claim 3, wherein the fastener is directly coupled to the clip body.

5. The stator assembly of claim 4, wherein the clip hole is sized to receive the fastener.

6. The stator assembly of claim 5, wherein the insert surrounds the fastener.

7. The stator assembly of claim 1, further comprising a plurality of electrical leads, the connection support assembly further includes a plurality of lead couplers each configured to couple the electrical leads to the support body, each of the plurality of lead couplers includes a coupler body and a pair of parallel columns directly protruding from the coupler body, each of the plurality of lead couplers protrudes directly from the support body, at least one of the plurality of electrical leads is disposed on the coupler body between the pair of parallel columns, the support body includes a locating protrusion, the locating protrusion is hollow, the stator core defines an inner stator wall, the inner stator wall defines a stator hole extending along a longitudinal axis, the stator assembly further includes a plurality of stator connectors and a plurality of terminals electrically connected to the plurality of stator connectors, the plurality of electrical leads electrically connect the plurality of terminals to the plurality of stator connectors, the plurality of stator connectors are electrically connected to at least one of the plurality of bar conductors, each of the plurality of terminals has a terminal hole, and the stator assembly further includes a weld joint to electrically connect one of the plurality of stator connectors to one of the plurality of bar conductors.

8. The stator assembly of claim 7, wherein the pin includes a first pin end and a second pin end opposite the first pin end, the first pin end is closer to the outermost surface of the support body than to the innermost surface of the support body, the second pin end is closer to the innermost surface of the support body than to the outermost surface of the support body, the second pin end is closer to the loop than the first pin end, the connection support assembly further includes a fastener extending through the clip hole and the insert hole, the fastener is a rivet, the fastener directly connected to the clip, the fastener is directly connected to the insert, and the insert hole is sized to receive the fastener, and at least one of the plurality of terminals is directly coupled to at least one of the plurality of electrical leads.

* * * * *